Patented Jan. 29, 1946

2,393,863

UNITED STATES PATENT OFFICE 2,393,863

ANTISTATIC COMPOSITION

Clayton Scott Myers, Westfield, N. J., assignor to Bakelite Corporation, a corporation of New Jersey No Drawing. Application March 26, 1942, Serial No. 436,253

7 Claims. (Cl. 106—13)

This invention relates to the suppression of electrostatic charges, for instance those charges developed by friction. The invention also includes compositions and the discovery of certain ingredients for use in compositions to effect this purpose. The invention will be described in connection with the treatment of vinyl resin surfaces although it is more broadly applicable.

The vinyl resins may be produced by the polymerization of vinyl halides, for instance vinyl chloride or other halide, or by polymerization of the vinyl esters of the lower aliphatic acids such as formic, acetic, propionic, butyric, valeric, or capronic acids, or by the conjoint polymerization of these esters and halides. The resins and particularly those which are formed by the polymerization of a vinyl halide, have the property of quickly receiving and of holding a static charge. This is disadvantageous in certain cases, for instance in the manufacture of watch crystals. The crystals may be formed by pressing them from clear polished transparent sheets of the resin. The sheet tends to collect an electrostatic charge which causes dust to adhere to the surface of the sheet. The dust particles may be pressed into the surface of the crystal under the forming pressure, particularly if the sheet is softened by heat (the resins being thermoplastic) to facilitate the forming operation. The same is true of other articles, for instance windshields, dial faces of gauges or other instruments for automobile and ship uses, or name plates and the like. Also, in the case of windshields, windows and the like of automobiles, airplanes and the like, the friction of the air develops a static charge which causes dust to adhere. A certain amount of dust will adhere to a windshield or window in any event, but much of the deposit and retention of dust is due to the electrostatic charge.

I have discovered that a normally solid polyethylene glycol, that is, one of relatively high molecular weight, if applied to a surface of a vinyl resin or similar material which normally holds a static charge, will eliminate the charge or its effect. The polyethylene glycol may be applied in any suitable manner and in any suitable composition as will hereinafter more fully be described. Thus, the producer of the vinyl resin sheets may apply the polyethylene glycol to the surfaces of the sheets directly after they are formed and before they are stacked or otherwise packaged for shipment. This will eliminate the static charge which is sometimes built up on the resin sheets and which tends to cause the sheets to adhere to each other or to the paper sheet which is frequently placed between the resin sheets to protect the surfaces. The user of the vinyl resin may also apply the polyethylene glycol. For instance, the manufacturer of the watch or dial faces may apply the polyethylene glycol to the surfaces of the sheets prior to forming the faces and thereby eliminate the effect of the static charge which would ordinarily be built up due to the operation. Also, the owner of an automobile may apply the polyethylene glycol to the gauge faces, windshield, windows and the like, and eliminate that accumulation of dust which may be held on the gauge face or other article due to static.

These and other objects and features of the invention will more fully appear as obvious or will be pointed out in the following description and accompanying claims.

The materials referred to herein as polyethylene glycols may also be referred to as polyoxyethylene glycols. The compounds may be formed by the reaction of ethylene oxide with ethylene glycol in the presence of an alkaline catalyst, and with the degree of addition of the ethylene oxide controlled to produce the molecular size desired. For instance, ethylene oxide may be reacted with ethylene glycol or other alkylene glycols of low molecular weight to give the polyethylene glycols. Polyethylene glycols having an average molecular weight of about 900 are normally solid, having a fusion or melting point of about 35° C. to 37° C. For the purposes of this invention, I use a polyglycol composition of the type disclosed herein, containing sufficient oxyethylene radicals to form a normally solid polyethylene glycol, and polyethylene glycol compositions having an average molecular weight of at least 900 are preferred. For the purpose of this disclosure, the term "polyethylene glycol" is intended to include the polyoxyethylene glycol compositions indicated and the term "solid" is intended to refer to materials which are semi-solid and will hold their shape at normal temperatures of approximately 20° C. as distinguished from those which are distinctly liquids and incapable of holding a given shape at normal temperatures.

The polyethylene glycols previously described are sufficiently soluble for the purposes of this invention, in many different solvents, for instance water as well as aromatic and aliphatic solvents. In addition to water, the polyethylene glycols are soluble in ketones, for instance acetone; alcohols, for instance ethanol; ester solvents, for instance ethyl acetate; aryl solvents, for instance benzene; aralkyl solvents, for instance toluene, and ethers.

for instance ethylene glycol monoethyl ether. A feature of the use of the polyethylene glycols is that they are miscible with water in all proportions and thus there is readily at hand a low cost solvent which does not attack the surfaces to which the composition is applied.

The polyethylene glycol compositions may be applied to substantially any surface, for instance surfaces of glass, polyvinyl butyral, polystyrene, cellulose nitrate and cellulose acetate, but the solvent must be chosen so that it does not attack the surface to be treated. Water is the preferred solvent and a feature of the invention is the discovery of a suitable antistatic material which is normally a clear transparent solid and which is water soluble. It is thus possible to eliminate the use of expensive and/or combustible solvents. Water is the preferred solvent because of its low cost and non-flammability.

The said glycols may be applied directly to the surface to be treated but they are preferably applied through the medium of an extending agent as a means of applying the extremely small amounts necessary to effect the result desired. Also, although the said glycols may be applied in the form of emulsions or dispersions, it is preferred that the extending agent be a solvent as, by the application of a solution, the small amount of the glycols may easily be spread and deposited quite uniformly over the surface.

The polyethylene glycols having the higher average molecular weights are harder than those of the lower average molecular weights and have higher melting points. A polyethylene glycol having an average molecular weight of approximately 900 (as determined by the Menzies and Wright method of determining molecular weights, described at page 2314, vol. 43 (1921) of the J. Amer. Chem. Soc.) has a density of approximately 1.152 g. per c. c. at 20° C., a melting point of approximately 35° C. to 37° C., a viscosity of 78 Saybolt Universal seconds at 210° F. and a flash point of 430° F. A polyethylene glycol having an average molecular weight of approximately 3500 (determined by the same method) has a density of approximately 1.203, a melting point of approximately 50° C. to 53° C., a viscosity of 418 and a flash point of 535° F. A polyethylene glycol having an average molecular weight of approximately 6000 has a melting point of about 60–65° C. In preparing the compositions contemplated herein, I may use the polyethylene glycols having the 35° C. melting point but prefer those which are harder, for instance those having a melting point of 45° C. or higher. All of these polyethylene glycols may be prepared free from odor and have the property of forming clear, colorless and stable solutions. In thin films, they are transparent and have the property of preventing the formation of a static charge on a glass or plastic surface. They do not absorb from the normal atmosphere such amounts of moisture as to interfere with vision through a glass or plastic sheet although under humid conditions the polyethylene glycols having a melting point of 37° C. or lower take on a moist appearance. The polyethylene glycols which have higher melting points, for instance from about 45° C. or higher, lack any appreciable hygroscopicity and the surfaces are dry in the sense that dust does not mechanically adhere to them to any greater extent than it does to glass or similar materials. Dust does not mechanically adhere as it does, for instance, to a film of glycerine.

The polyethylene glycols may be applied to the surface to be treated, in any suitable manner. For instance, they may be rubbed over the surface of a sheet of resin, glass or other plastic, or a solution thereof may be applied to the surface of the sheet. If desired, the sheet may then be polished, preferably with a soft cloth which does not mar the surface of the sheet. This polishing may be done by hand, as in the case where the windshield or window of a car or a gauge face is treated, or it may be done on a production basis as in the case of a sheet manufacturer where the sheets are passed in sequence under a polishing roll. The polyethylene glycols or a solution thereof, also may be applied to the polishing cloth or roll instead of to the surface of the article. The polyethylene glycols are characterized by a tendency to effect a spreading of their solutions over the surface of a sheet to which they are applied. The polishing action, if used, tends to effect a further spreading and to work the materials into the surface of the sheet; also the heat of friction tends to soften the materials, which are thermoplastic, and to facilitate the application thereof to the surface, as well as to drive off any volatile solvent which may be present.

In order to facilitate the application and adherence of the polyethylene glycols to the surface to be treated, my invention contemplates the use of a wetting agent in conjunction with the said glycols. In a broad aspect of the invention, a wetting agent of general wetting characteristics may be used but I have discovered that a certain class of substances, namely those containing organic radicals and combined sulfur and, in particular, the wetting agents next described give exceptional results in connection with said glycols. These agents, are, in general, basically esters carrying combined sulfur in the form of a sulfite, sulfate, or sulfonate group. The said substances may be metallic alkyl or aryl sulfates, the metal preferably being an alkali or an alkali earth metal. The substances may also be classed as salts of oxysulfur organic compounds. They include the salts of the sulfated high molecular weight alcohols, sulfonated esters of dibasic acids and higher alcohols, and alkylated aryl sulfonates. Salts of the sulfate ester derivatives of the higher saturated, branched-chain aliphatic alcohols, including both the primary and secondary alcohols, are suitable. These sulfate ester salts may be those of the alkali metal hydroxides, the ethanolamines and of other bases. Sulfate ester derivatives of the higher saturated branched-chain aliphatic alcohols which are described in the U. S. patent of Wickert, No. 2,088,019, dated July 27, 1937, are satisfactory for my purposes.

Other salts of oxysulfur organic compounds which may be used include salts of various sulfated higher fatty alcohols obtained from fats and oils of animal and vegetable origin, salts of the alkylated aryl sulfonates, and salts of the diaryl esters of sulfosuccinic acid such as, for example, the dioctyl ester and the dihexyl ester of sodium sulfosuccinic acid. Surface active wetting agents of the type of fatty alcohol sulfates are also contemplated. In general, good results may be obtained with these previously described surface-active wetting agents having from eight to twenty carbon atoms per molecule. Salts of the sulfate ester derivatives of the saturated branched-chain aliphatic alcohols are preferred, however, and exceptionally good results were obtained with those having eight to seventeen carbon atoms to the molecule.

These substances are all water soluble and act as extremely effective surface-wetting agents when used in conjunction with the said glycols even though minute quantities are incorporated.

Other ingredients may be combined with the said polyethylene glycols and metallic organic sulfates, if desired. For instance, in order to remove surface dirt, a soft filler, non-abrasive to the surface to be treated, may be incorporated. Soft grades of unoiled diatomaceous earth and other inert fillers, as magnesium silicate, may be used. Certain other classes of materials may be included in the composition but are not recommended. For instance, ordinary soap may be included but is not recommended as it tends to leave a scum on the treated surface, particularly if the ingredients are incorporated in hard water. The ingredients used in the preferred composition do not form a scum in hard water, nor do they form a film to which dust will adhere, nor do they absorb the active antistatic and wetting agents.

For the purpose of further illustrating the invention, reference may be had to the following examples:

*Example 1.*—A solution was made by dissolving 0.06 part by weight of a normally solid polyethylene glycol having a melting point of 50° C. to 53° C. and the other characteristics of this material previously described, in 99.94 parts by weight of water. The solution was applied to the surface of a clear transparent sheet of vinyl resin (a conjoint polymer of vinyl chloride and vinyl acetate) and permitted to dry. The surface was then polished by hand with a flannel cloth, which would ordinarily develop a high static charge on the surface of an untreated sheet of the resin; however, in the case of the treated sheet, there was substantially no static charge. The film of the said glycol was so thin in this case that the antistatic effect began to be less noticeable after about 10 hours. This was probably due to the fact that the sheet was frequently polished, without fresh application of the solution, during the 10 hours, to test the efficacy of the material and during these polishings the polyethylene glycol was abraded from the surface of the resin. But with such a thin film, the antistatic effect remains for a sufficient period to enable the sheet to be manipulated in the process of forming watch crystals, without building up an objectionable static charge. Furthermore, where such a film is applied to a sheet which is then stacked, packaged or otherwise assembled with other sheets, for storage or shipment, the antistatic effect will last for prolonged periods of time running into years. On the windshield or windows of an automobile, the film will withstand several polishings to remove mechanically adhering dust and these polishings need not be so frequent as usual because the electrostatic adherence of dust is minimized.

Compositions involving the use of a wetting agent, are illustrated by the following examples:

*Example 2.*—A solution was made by dissolving 0.06 part by weight of the glycol of Example 1, and 0.006 part of a wetting agent of the class described, in sufficient water to make a total of 100 parts. This solution was applied to the surface of a resin sheet as in Example 1. The effect of the minute amount of wetting agent was to assist the wetting of the polished resin surface, which extended the antistatic effect from 10 hours to 16 hours. The wetting agent in this case was sodium heptadecyl sulfate (sodium sulfate ester derivative of 3,9 diethyl tridecanol-6). It is a stable, water soluble liquid. Other wetting agents containing sulfur in chemical combination can be used instead of the one given. For instance, any of the following may be used: sodium octyl sulfate (monosodium sulfate ester derivative of 2-ethyl hexanol-1); sodium tetradecyl sulfate (sodium sulfate ester derivative of 7 ethyl, 2 methyl undecanol-6); dioctyl ester of sodium sulfosuccinic acid; dihexyl ester of sodium sulfosuccinic acid; a fatty alcohol sulfate; sodium tetradecyl sulfate (sodium sulfate ester derivative of 7 ethyl, 2 methyl undecanol-4).

*Example 3.*—A solution was made of 10 parts by weight of the polyethylene glycol of Example 1, 0.25 part of the wetting agent of Example 2 and sufficient water to make a total of 100 parts. This solution was applied to the calendered, unpolished surface of a conjoint polymer vinyl chloride-vinyl acetate vinyl resin sheet. The static was completely suppressed and remained suppressed during a period of 12 months during which the sheet was continuously exposed to the atmosphere within a building. At the end of this period the test was discontinued.

*Example 4.*—For general use on glass or plastic windshields, windows and the like, a solution comprising from about 0.50 to 1.0 part by weight of the polyethylene glycol of Example 1, from about 0.12 to 0.24 part of the wetting agent of Example 2 and sufficient water to make a total of 100 parts, is very satisfactory. For optimum results per unit of cost, I use 0.75 part of the polyethylene glycol and 0.18 part of the wetting agent. This solution, applied to the glass windows and windshield of a car, then permitted to dry and subsequently polished, will normally prevent the static effect and the accumulation of dust due to the static effect, for at least one week unless dissolved and washed away by the direct application of running water. Also, in the case of rain, the composition will prevent the adherence of the first droplets of water to the windshield as droplets, causing the droplets to spread into a film instead of remaining as such on the surface. The exterior surfaces of the windows and windshield of an automobile are usually so spattered after running in the rain, that they have to be cleaned and the use of the compositions herein described, as the cleaners, applies a new coating of the antistatic.

*Example 5.*—A composition involving a mechanical abradant or scouring material to remove mechanically adhering dirt from the surface to be treated, may comprise 10 parts by weight of diatomaceous earth, 0.125 part of the wetting agent, 0.25 part of the polyethylene glycol, 0.8 part of anhydrous soap and sufficient water to make a total of 100 parts. The proportions of the ingredients may be varied in this example as well as in the other examples and the wetting agents disclosed overcome the undesirable scum-forming properties of the soap.

In the foregoing description, when the polyethylene glycols are referred to as having given molecular weights or average molecular weights, it is to be understood that the mass may be a mixture of polyethylene glycols of different molecular weights. For instance, ethylene glycol has a molecular weight, in round numbers, of 62 and each ethylene oxide radical has a molecular weight of 44. Polyethylene glycol composed of nineteen ethylene oxide radicals added to one ethylene glycol molecule has a molecular weight of 898. A polyethylene glycol having an average molecular weight of 900 may thus be a mixture of polyethylene glycols wherein, for instance, there may be some polyethylene glycol molecules containing eighteen or less, and some containing twenty or more, ethylene oxide radicals, but the molecular weight or the average molecular weight of the mass as determined by test is about 900 and is considered herein as having this molecular weight as it has the characteristics, for instance physical solidity at normal temperatures, hereinbefore described. Thus, the essential anti-static element which I contemplate using is a normally solid polyethylene glycol and the preferred composition includes a surface wetting agent. Water is the preferred extending agent. The anti-static compositions are not, however, limited only to those which include only the three elements, as the polyethylene glycol may be used by itself, or with only an extending agent or with only a surface wetting agent. Also, substantially any other suitable ingredient, for instance diatomaceous earth, may be incorporated with a polyethylene glycol to take advantage of its particular characteristics.

I claim:

1. A surface of a vinyl resin having applied thereto a film for decreasing the accumulation of static electricity thereon, said film comprising a polyethylene glycol of such high average molecular weight as to be normally solid.

2. Method of reducing the accumulation of static charges on surfaces of vinyl resin materials which normally develop and hold static charges conducive to the collection of dust, which method comprises applying to the surfaces a composition comprising a polyethylene glycol of such high average molecular weight that the said glycol is normally solid, and a sulfated surface wetting agent.

3. Method of reducing the accumulation of static charges on surfaces of vinyl resin materials which normally develop and hold static charges conducive to the collection of dust, which method comprises applying to the surfaces a composition comprising a polyethylene glycol of such high average molecular weight that the said glycol is normally solid, and sodium heptadecyl sulfate.

4. A surface of a vinyl resin capable of developing and holding an electrostatic charge having applied thereto a film for decreasing the accumulation of static electricity thereon, said film comprising a polyethylene glycol of such high average molecular weight as to be normally solid and a sulfated surface wetting agent.

5. Method of reducing the accumulation of static charges on sheets of vinyl resin which comprises applying to the surfaces of said sheets a polyethylene glycol of such high average molecular weight that the glycol is normally solid and polishing the surfaces thus treated to work the glycol into the surface of the sheets.

6. Method of reducing the accumulation of static charges on sheets of vinyl resin which comprises applying to the surfaces of said sheets a surface wetting agent and a polyethylene glycol of such high average molecular weight that the glycol is normally solid and polishing the surfaces thus treated to work the glycol into the surface of the sheets.

7. A surface of a vinyl resin having applied thereto a film for decreasing the accumulation of static electricity thereon, said film comprising a surface wetting agent and a polyethylene glycol of such high average molecular weight as to be normally solid.

CLAYTON SCOTT MYERS.

Certificate of Correction

Patent No. 2,393,863.  January 29, 1946.

CLAYTON SCOTT MYERS

It is hereby certified that errors appear in the printed specification of the above numbered patent requiring correction as follows: Page 3, first column, lines 20–21, for "absorb" read *adsorb*; line 46, after "But" insert *even*; page 4, first column, lines 31–32, claim 2, and second column, lines 2–3, claim 3, strike out the word "materials"; same page, second column, lines 17 and 24, claims 5 and 6, for "sheets" read *surfaces*; lines 18 and 25, same claims 5 and 6, strike out "of said sheets"; and that the said Letters Patent should be read with these corrections therein that the same may conform to the record of the case in the Patent Office.

Signed and sealed this 7th day of May, A. D. 1946.

[SEAL]

LESLIE FRAZER,
*First Assistant Commissioner of Patents.*